Patented Aug. 27, 1935

2,012,641

UNITED STATES PATENT OFFICE 2,012,641

BOILER SCALE AND RUST REMOVING COMPOSITION

Edward Lewis Smead, Mexico, D. F., Mexico

No Drawing. Application May 5, 1933, Serial No. 669,604. In Mexico November 30, 1932

3 Claims. (Cl. 87—27)

This invention refers to a new and useful industrial product and more particularly to a product which is useful in cleaning scale and other impurities from the interior of steam and water boilers, or boilers of both classes. This product is also useful in removing rust from all classes of articles including cloth and other articles in general.

Today the henequen plant which is found in various parts of Mexico, is used for the purpose of obtaining one main product, that is, fiber, and two by-products, that is, pulp and juice. Having made an effort to find a use for either or both of these by-products, I have experimented with the juice and found that certain concentrates thereof attack rust and scale with great efficiency and it is this concentrate of the juice of the henequen plant which constitutes the new and useful industrial product referred to in this invention.

The juice of the henequen plant may be obtained through any of several known and ordinary means, that is, by scraping, which has for its principal object the extraction of the fiber but which also separates the juice; or it may be obtained by compressing or crushing. The juice obtained in this manner is then reduced to a concentrate which I have found to be useful in the manner specified and which constitutes the principal ingredient of my invention. The means used to obtain the concentrate do not constitute an important part of the procedure of the manufacture of the product notwithstanding the fact that my experiments have shown that the most practical method is by boiling the raw juice.

I have found that concentrates of two to one, three to one, four to one and five to one produce magnificent results and each of the concentrates mentioned above will have its especial use.

The product as described above is susceptible of fermentation and the consequent danger produced by such reaction. Naturally, it was impossible to introduce to the industrial world a fermenting product and therefore I conducted numerous experiments with a view to encountering an agent which would impede fermentation. As a result of these experiments I have discovered that, for instance, the use of carbolic acid in the proportion of one gram per liter of the henequen juice has great efficiency and completely prohibits fermentation. The scope of this invention is however not limited to the use of carbolic acid to prohibit fermentation. The new industrial cleaning product which I have perfected must be a non-fermenting product and the object of this invention is to provide a product of that nature. Consequently, I may use any other chemical agent which prohibits fermentation in a proportion other than that mentioned with regard to carbolic acid.

It should be understood that the invention is not limited to the composition of the product and the proportions given, but may be varied widely without departing from the spirit of the invention as defined by the claims.

I claim:

1. A new industrial cleaning product useful in attacking rust and scale and for cleaning in general and especially for cleaning the interior of boilers; said product consisting of the juice of henequen plant reduced to a concentrate ranging between two to one and five to one, mixed with a preservative completely prohibiting fermentation of said juice.

2. A non-fermenting industrial product composed of concentrated henequen juice, as described in claim 1, and a chemical agent of the carbolic acid type which prevents fermentation.

3. A new industrial cleaning product useful in attacking rust and scale and for cleaning in general and especially for cleaning the interior of boilers; said product consisting of the juice of henequen plant reduced to a concentrate ranging between two to one and five to one, mixed with a disinfectant of the carbolic acid type in the approximate proportion of one gram of said acid to one liter of the concentrated juice.

EDWARD LEWIS SMEAD.